United States Patent
Shi et al.

(10) Patent No.: US 10,887,716 B2
(45) Date of Patent: *Jan. 5, 2021

(54) GRAPHICAL USER INTERFACE FOR CALIBRATING A SURROUND SOUND SYSTEM

(71) Applicant: DTS, Inc., Calabasas, CA (US)

(72) Inventors: Guangji Shi, San Jose, CA (US); Michael M. Goodwin, Scotts Valley, CA (US); Martin Walsh, Scotts Valley, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,784

(22) Filed: Aug. 2, 2019

(65) Prior Publication Data

US 2019/0394599 A1    Dec. 26, 2019

Related U.S. Application Data

(63) Continuation of application No. 15/357,971, filed on Nov. 21, 2016, now Pat. No. 10,375,498.

(60) Provisional application No. 62/423,041, filed on Nov. 16, 2016.

(51) Int. Cl.
*H04S 7/00* (2006.01)
*G06F 3/048* (2013.01)
*H04R 3/00* (2006.01)
*G06F 3/16* (2006.01)
(Continued)

(52) U.S. Cl.
CPC ............. *H04S 7/301* (2013.01); *G06F 3/048* (2013.01); *G06F 3/165* (2013.01); *H04R 3/005* (2013.01); *H04R 29/001* (2013.01); *H04S 7/308* (2013.01); *H04S 7/40* (2013.01); *G06F 3/0488* (2013.01); *H04R 2205/024* (2013.01); *H04S 7/302* (2013.01); *H04S 2400/01* (2013.01)

(58) Field of Classification Search
None
See application file for complete search history.

(56) References Cited

U.S. PATENT DOCUMENTS 6,826,284 B1    11/2004   Benesty et al.
7,805,286 B2    9/2010    Jorgensen et al.
7,859,533 B2    12/2010   Kitayama et al.
(Continued)

OTHER PUBLICATIONS

Written Opinion for International Application No. PCT/US2017/061034, Notification dated Oct. 5, 2018.
(Continued)

*Primary Examiner* — Yongjia Pan
(74) *Attorney, Agent, or Firm* — Knobbe Martens Olson & Bear LLP

(57) ABSTRACT

A method and a system for calibrating a surround sound system are disclosed. The calibration system can provide a graphical user interface for display comprising a visual representation of the room hosting a multichannel surround sound system. The graphical user interface can permit user input of gestures to place or make changes to the placement of icons representing one or more loudspeakers and a listener. The calibration system can estimate the positions of the one or more loudspeakers or the listener based on the placement of the icons in the model room. A spatial calibration based on the estimated positions can then be performed such that the multichannel surround sound system can render sound scenes more accurately.

20 Claims, 7 Drawing Sheets

(51) Int. Cl.
*H04R 29/00* (2006.01)
*G06F 3/0488* (2013.01)

(56) References Cited

U.S. PATENT DOCUMENTS

| | | | |
|---|---|---|---|
| 8,525,813 | B1 | 9/2013 | Smith et al. |
| 9,015,612 | B2 | 4/2015 | Nguyen et al. |
| 9,107,021 | B2 | 8/2015 | Florencio et al. |
| 9,377,941 | B2 | 6/2016 | Nguyen et al. |
| 9,380,399 | B2 | 6/2016 | Noah |
| 9,560,449 | B2 | 1/2017 | Carlsson et al. |
| 9,560,460 | B2 | 1/2017 | Chaikin et al. |
| 9,569,073 | B2 | 2/2017 | Tan |
| 9,690,539 | B2 | 6/2017 | Sheen et al. |
| 9,716,960 | B2 | 7/2017 | Jorgensen et al. |
| 9,820,047 | B2 | 11/2017 | Kawamura et al. |
| 9,986,359 | B1 | 5/2018 | Shi et al. |
| 2001/0038702 | A1 | 11/2001 | Lavoie et al. |
| 2003/0007648 | A1 | 1/2003 | Currell |
| 2003/0198353 | A1 | 10/2003 | Monks et al. |
| 2005/0220309 | A1 | 10/2005 | Hirata et al. |
| 2009/0238370 | A1 | 9/2009 | Rumsey et al. |
| 2009/0238371 | A1 | 9/2009 | Rumsey et al. |
| 2010/0272270 | A1 | 10/2010 | Chaikin et al. |
| 2011/0091055 | A1 | 4/2011 | LeBlane |
| 2012/0114152 | A1 | 5/2012 | Nguyen et al. |
| 2012/0117502 | A1 | 5/2012 | Nguyen et al. |
| 2012/0183151 | A1 | 7/2012 | Jorgensen et al. |
| 2012/0288124 | A1 | 11/2012 | Fejzo et al. |
| 2013/0058492 | A1 | 3/2013 | Sizle et al. |
| 2013/0223658 | A1 | 8/2013 | Betlehem et al. |
| 2015/0016642 | A1 | 1/2015 | Walsh et al. |
| 2015/0098596 | A1 | 4/2015 | Noah |
| 2015/0172814 | A1 | 6/2015 | Usher et al. |
| 2015/0208188 | A1 | 7/2015 | Carlsson et al. |
| 2015/0215722 | A1 | 7/2015 | Milne et al. |
| 2015/0256957 | A1 | 9/2015 | Kim et al. |
| 2015/0271616 | A1 | 9/2015 | Kechichian |
| 2016/0092072 | A1 | 3/2016 | So et al. |
| 2016/0219516 | A1 | 7/2016 | Subramanian et al. |
| 2016/0309276 | A1 | 10/2016 | Ridihalgh et al. |
| 2016/0309277 | A1 | 10/2016 | Hiscock |
| 2017/0013386 | A1 | 1/2017 | Vautin et al. |
| 2017/0142536 | A1 | 5/2017 | Hattori et al. |
| 2018/0136898 | A1 | 5/2018 | Shi et al. |
| 2018/0249273 | A1 | 8/2018 | Shi et al. |
| 2019/0268710 | A1 | 8/2019 | Shi et al. |

OTHER PUBLICATIONS

International Search Report and Written Opinion for International Application No. PCT/US2017/061034, Notification dated Jan. 24, 2018.

International Search Report and Written Opinion for International Application No. PCT/US2017/061033, Notification dated Jan. 24, 2018.

100

SOUNDBAR/CENTER
SPEAKER

AV RECEIVER/
AMPLIFIER

FRONT COMPONENT
102

CALIBRATION
ENGINE
104

NETWORK 110

USER DEVICE
122

CALIBRATION
APPLICATION
124

SMARTPHONE/TABLET

DESKTOP/LAPTOP PC

GRAPHICAL USER INTERFACE FOR CALIBRATING A SURROUND SOUND SYSTEM

INCORPORATION BY REFERENCE TO RELATED APPLICATION

This application is a continuation of U.S. patent application Ser. No. 15/357,971, entitled "GRAPHICAL USER INTERFACE FOR CALIBRATING A SURROUND SOUND SYSTEM" and filed on Nov. 21, 2016, which claims the benefit of U.S. Provisional Patent Application No. 62/423,041, entitled "SYSTEM AND METHOD FOR LOUDSPEAKER POSITION ESTIMATION" and filed on Nov. 16, 2016, each of which is hereby incorporated by reference herein in its entirety. Any and all applications, if any, for which a foreign or domestic priority claim is identified in the Application Data Sheet of the present application are hereby incorporated by reference under 37 CFR 1.57.

BACKGROUND

Traditionally, surround sound systems are calibrated using a microphone or microphone array placed at a "sweet spot" or default listening position to measure audio signals played by each of the loudspeakers. The microphone or microphone array is usually tethered to an AV receiver or processor by means of a long cable. Alternatively, some systems include integrated microphones which may be used for calibration.

SUMMARY

A brief summary of various exemplary embodiments is presented. Some simplifications and omissions may be made in the following summary, which is intended to highlight and introduce some aspects of the various exemplary embodiments, but not to limit the scope of the inventions disclosed herein. Detailed descriptions of embodiments sufficient to allow those of ordinary skill in the art to make and use the inventive concepts follows in later sections.

In certain embodiments, a system for calibrating a multichannel surround sound system with one or more loudspeakers includes one or more processors in communication with a multichannel surround sound system comprising a plurality of loudspeakers, and a machine-readable medium having instructions stored thereon that, when executed by the one or more processors, cause the one or more processors to perform various operations. These operations can include outputting a graphical user interface for display, where the graphical user interface includes a model room having speaker icons indicating initial positions of the loudspeakers and a listener icon indicating an initial position of a listener. The operations may further include receiving user input through the graphical user interface. The user input can include adjusting one or both of (1) one or more of the speaker icons and (2) the listener icon inside the model room. The adjusting can produce modified positions of one or more of the loudspeakers and the listener. The operations can further include, in response to receiving the user input, performing a spatial calibration for the multichannel surround sound system based on the modified positions of one or both of the one or more loudspeakers and the listener. Moreover, the operations can include applying processing derived from the spatial calibration to audio for playback through the loudspeakers.

The system of the preceding paragraph may be implemented together with any combination of the following features: the graphical user interface provides a default model room and a default arrangement of the loudspeakers and listener; the user input further includes moving borders of the model room to adjust dimensions of the default model room with finger gestures on the touchscreen; the user input further includes adding, removing and moving one or more of the speaker icons and/or the listener icon within the model room with finger gestures on the touchscreen; the position of the one or more loudspeakers and the position of the listener each includes a distance and an angle relative to a reference point in the model room; the reference point in the model room is the center of a front component of the multichannel surround sound system, the front component including a sound bar, a center-channel loudspeaker or an audio-visual (A/V) receiver; the positions of the one or more loudspeakers and the at least one listener are estimated further based on a scale of the model room and a reference point in the model room; initial positions of the loudspeakers and the listener can be obtained by selecting from presets; the initial positions of the loudspeakers can be adjusted through calibration; the calibration uses an integrated microphone array located at the front component of the multi-channel surround sound system and plays a noise sequence from each loudspeaker; the positions of the loudspeakers and the listener can be adjusted using a touch screen.

Further, the instructions of the system may further include: receiving user input including moving one or more of the icons representing one or more of the loudspeakers and the listener inside the model room with gestures; responding to determining a change in the placement of the icons representing the one or more loudspeakers or the at least one listener since last calibration, updating positions of the one or more loudspeakers or the at least one listener based on the placement change of the icons inside the model room; and performing a recalibration to compensate for at least one of the updated positions of the one or more loudspeakers or the at least one listener.

In certain embodiments, a method for calibrating a multichannel surround sound system with one or more loudspeakers can include, under control of a hardware processor, outputting a graphical user interface for display, where the graphical user interface includes a model room having icons indicating initial positions of the loudspeakers. The method can further include receiving user input through the graphical user interface. The user input can include adjusting the icons representing one or more of the loudspeakers inside the model room. This adjusting can produce modified positions of one or more of the loudspeakers. The method may also include, in response to receiving the user input, performing a spatial calibration for the multichannel surround sound system based on the modified positions of one or more of the loudspeakers. Moreover, the method may include applying the spatial calibration to audio for playback through the loudspeakers.

The method of the preceding paragraph may be implemented together with any combination of the following features: the graphical user interface can provide a default model room and a default arrangement of the loudspeakers; the user input can further include moving borders of the model room to adjust the dimensions of the default model room with finger gestures on the touchscreen; the user input can further include adding, removing and moving the icons representing the one or more loudspeakers within the model room with finger gestures on the touchscreen; the position of the one or more loudspeakers can each include a distance and an angle relative to a reference point in the model room; the reference point in the model room can be the center of a front component of the multichannel surround sound system, the front component including a sound bar, a center channel loudspeaker or an audio-visual (A/V) receiver; the positions of the one or more loudspeakers can be estimated further based on a scale of the model room and a reference point in the model room; the method can further include receiving additional user input including an adjustment of a listener icon representing a position of a listener in the model room, and performing the spatial calibration can be further based upon the additional user input.

The method can also include: receiving user input including moving icons representing one or more loudspeakers inside the model room; responding to determining a change in the placement of the icons representing the one or more loudspeakers or the at least one listener since last calibration, updating positions of the one or more loudspeakers or the at least one listener based on the placement change of the icons inside the model room; and performing a recalibration to compensate for at least one of the updated positions of the one or more loudspeakers.

In certain embodiments, an apparatus for calibrating a multichannel surround sound system including one or more loudspeakers can include a graphical user interface provided by a client device. The graphical user interface can display a model room indicating estimated locations of one or more loudspeakers and receive user input through the graphical user interface. The user input can include moving icons representing one or more loudspeakers inside the model room. The apparatus can further include a calibration engine that can perform a spatial calibration for the multichannel surround sound system based at least on one of the estimated positions of the one or more loudspeakers.

The apparatus of the preceding paragraph may be implemented together with any combination of the following features: the graphical user interface can display a default model room and a default arrangement of the loudspeakers; the user input can also include moving borders of the model room to adjust the dimensions of the default model room with finger gestures on the touchscreen, and adding, removing and moving the icons representing the one or more loudspeakers with finger gestures on the touchscreen; the graphical user interface can also receive additional user input including an adjustment of a listener icon representing a position of a listener in the model room; and the calibration engine can also perform the spatial calibration based upon the additional user input.

In some embodiments, the graphical user interface of the apparatus can also receive user input including moving the icons representing the one or more loudspeakers inside the model room with gestures. Accordingly, the calibration engine can also update positions of the one or more loudspeakers based on a placement change of the icons inside the model room, in response to determining the placement change of the icons representing the one or more loudspeakers since last calibration; and the calibration engine can perform a recalibration to compensate for at least one of the updated positions of the one or more loudspeakers.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
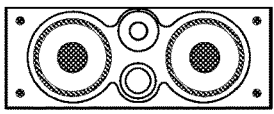
FIG. 1 is a block diagram illustrating an example environment for calibrating multichannel surround sound systems, in accordance with one or more embodiments.
Figure 1:
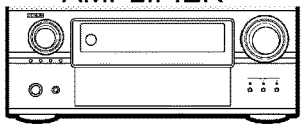
Figure 1:
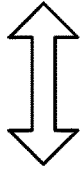
Figure 1:
Figure 1:
Figure 1:
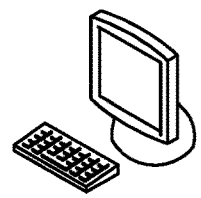

The detailed description set forth below in connection with the appended drawings is intended as a description of the presently preferred embodiment of the inventions disclosed herein and is not intended to represent the only form in which the inventions may be constructed or utilized. The description sets forth the functions and the sequence of steps for developing and operating the inventions in connection with the illustrated embodiments. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

The embodiments disclosed herein relate generally to processing audio signals. These signals may be represented by digital electronic signals. In the discussion which follows, analog waveforms may be shown or discussed to illustrate the concepts; however, it should be understood that some embodiments operate in the context of a time series of digital data, said data forming a discrete approximation of an analog signal or (ultimately) a physical sound. The discrete, digital signal corresponds to a digital representation of a periodically sampled audio waveform. For uniform sampling, the waveform is typically sampled at a rate at least sufficient to satisfy the Nyquist sampling theorem for the frequencies of interest. For example, in one embodiment a uniform sampling rate of approximately 44.1 kHz may be used. Higher sampling rates such as 96 kHz may alternatively be used, among many other possibilities. The quantization scheme and bit resolution may be chosen to satisfy the requirements of a particular application. The embodiments disclosed herein can be applied interdependently in a number of channels. For example, embodiments could be used in the context of a "surround" audio system having more than two channels, or having two channels plus virtual channels.

As used herein, a "digital audio signal" or "audio signal," in addition to having their ordinary meaning, does not describe a mere mathematical abstraction, but instead denotes information embodied in or carried by a physical medium capable of detection by a machine or apparatus. These terms include recorded or transmitted signals, and should be understood to include conveyance by any form of encoding, including but not limited to pulse code modulation (PCM). Outputs or inputs, or indeed intermediate audio signals could be encoded or compressed by any of various known methods, including (for example) MPEG, ATRAC, AC3, or the proprietary methods of DTS, Inc. as described in U.S. Pat. Nos. 5,974,380, 5,978,762, and 6,487,535. Some modification of calculations described therein may be performed to accommodate embodiments described herein.

The embodiments described herein may be implemented in an electronic device, such as a DVD or Blue-Ray™ Disc player, TV tuner, CD player, handheld player, Internet audio/video device, a gaming console, a mobile phone, tablet, laptop, desktop, soundbar, combinations of the same, or the like. The electronic device can include a processor, such as a Central Processing Unit (CPU) or a Digital Signal Processor (DSP), or multiple processors or processor cores. The processor may include one or more types of such processors, such as an IBM PowerPC, Intel Pentium (x86) processors, or any other processor architecture. A Random Access Memory (RAM) temporarily stores results of the data processing operations performed by the CPU or DSP, and may be interconnected thereto typically via a dedicated memory channel. The electronic device may also include a storage device such as a hard drive, which is also in communication with the CPU or DSP over an I/O bus. Other types of storage devices such as tape drives, optical disk drives may also be connected. A graphics card may also be connected to the CPU or DSP via a video bus, which can transmit signals representative of display data to the display monitor. External peripheral data input devices, such as a keyboard or a mouse, may be connected to the audio reproduction system over a serial or parallel port, such as a USB (Universal Serial Bus) port. A USB controller can translate data and instructions to and from the CPU for external peripherals connected to the USB port. Additional devices such as printers, microphones, loudspeakers (generally referred to herein as "speakers"), and the like may be connected to the electronic device.

The electronic device may, but need not, utilize an operating system having a graphical user interface (GUI), such as WINDOWS from Microsoft Corporation of Redmond, Wash., MAC OS from Apple, Inc. of Cupertino, Calif., various versions of mobile GUIs designed for mobile operating systems such as Google™ Android, Apple iOS™, and so forth. In other embodiments, the operating system may be a real time operating system (RTOS), or an operating system may be omitted. The electronic device may execute one or more computer programs. Generally, the operating system and computer programs may be tangibly embodied in a computer-readable medium, e.g., one or more of the fixed and/or removable data storage devices including the hard drive. Both the operating system and the computer programs may be loaded from the aforementioned data storage devices into the RAM for execution by the CPU or DSP. The computer programs may comprise instructions which, when read and executed by the CPU or DSP, cause the same to perform the steps or features of the embodiments disclosed herein.

The embodiments disclosed herein may have many different configurations and architectures. Any such configuration or architecture may be readily substituted with another. The above described processing and storage sequences are the most commonly utilized in computer-readable mediums, but there are other existing sequences that may be substituted therewith.

Embodiments may be implemented by hardware, firmware, software or any combination thereof. When implemented as hardware, an embodiment may be employed on one audio signal processor or distributed amongst various processing components. When implemented in software, an embodiment can include code segments to perform associated tasks. The software preferably includes code to carry out the operations described in various embodiments or code that emulates or simulates the operations. The program or code segments can be stored in a processor or machine accessible medium or transmitted by a computer data signal embodied in a carrier wave, or a signal modulated by a carrier, over a transmission medium. The processor readable or accessible medium or the machine readable or accessible medium may include any medium that can store, transmit, or transfer information.

Examples of the processor readable medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, an Intranet, or the like. The machine accessible medium may be embodied in an article of manufacture. The machine accessible medium may include data that, when accessed by a machine, cause the machine to perform the operation described in the following. The term "data," in addition to having its ordinary meaning, herein refers to any type of information that is encoded for machine-readable purposes. Therefore, data may include a program, executable code, information, information organized into a data structure (such as a file), or the like.

Embodiments may be implemented by software executing in a processor. The software may have several modules coupled to one another. A software module can be coupled to another module to receive variables, parameters, arguments, pointers, etc. and/or to generate or pass results, updated variables, pointers, etc. A software module may also be a software driver or interface to interact with an operating system. A software module may also be a hardware driver to configure, set up, initialize, send and receive data to and from a hardware device.

Embodiments may be described as a process which may be depicted as a flowchart, a flow diagram, a structure diagram, or a block diagram. Although a block diagram may describe the operations as a sequential process, many of the operations can be performed in parallel or concurrently. In addition, the order of the operations may be re-arranged. A process can be terminated when its operations are completed, or a process may run indefinitely until interrupted. A process may correspond to a method, a program, a procedure, combinations of the same, or the like.

Overview

When a loudspeaker is repositioned or the listener moves away from the "sweet spot" described above, existing calibration methods have no way to account for such changes without manually repeating the calibration process. It is therefore beneficial to have a method and apparatus to calibrate surround sound systems via user input in a user interface, such as touchscreen graphical user input, to more readily accommodate these situations.

The advent and proliferation of DVD, Blu-ray and streaming content has led to the availability of multichannel soundtracks. Best practices of the industry and modern surround sound formats have specified ideal loudspeaker placement to properly reproduce such multichannel content. However, typical consumers with surround sound systems often cannot comply with the specified loudspeaker placement due to practical reasons, such as room constraints, furniture placement, or artistic preferences. Further, some consumers do not fully understand best practices for speaker placement and may benefit from computerized instructions that aim to improve their listening experience.

When loudspeakers in a multichannel surround sound system are not placed at the ideal specified locations, playback of standard multichannel sound results in a distorted rendering of the intended sound scene. One solution to this problem, generally known as spatial calibration, typically involves a user placing a calibration microphone or microphone array at a default listening position (or sweet spot). The calibration process can include playing a test signal over each loudspeaker and analyzing the respective signals captured by the calibration microphone (or microphones) to approximate the location of each loudspeaker. By approximating the location of each loudspeaker, the system can spatially reformat a multichannel soundtrack to the actual speaker layout. However, this calibration process can be intimidating or inconvenient for a typical consumer and is only ideal for the default listening position used in the calibration. Other approaches for spatial calibration include incorporating a microphone at each loudspeaker in the surround sound system or using the loudspeakers themselves as microphones during calibration, each of which can be expensive in cost or complexity.

The aforementioned calibration methods only estimate the loudspeaker positions and only provide a system calibration for a specific listening sweet spot. If a listener is not positioned at the sweet spot, all of the aforementioned existing methods are insufficient to produce improved surround sound playback since such methods have no way to readily detect or be informed of a different listening position than the assumed sweet spot. In some existing methods, the entire calibration process would have to be repeated for a new listening location. As can be imagined, any of these processes are difficult and cumbersome for most consumers to use.

Embodiments disclosed herein provide a method and an apparatus for calibrating multichannel surround sound systems with significantly reduced user intervention compared with prior methods. The apparatus can include a calibration engine embedded in an anchoring component placed at a fixed position in a listening room. For example, the anchoring component can be a sound bar or an A/V receiver positioned directly below (or otherwise near) a video screen or TV in the front center. Furthermore, in some embodiments, any of the user interface features described below can be used together with prior, more cumbersome calibration methods.

For convenience, this disclosure refers to "front" as a location near the TV or sound bar, "rear" as a location generally opposite the TV and/or behind or next to a typical listener's position. A center speaker may be close to the TV or sound bar (or in the TV or sound bar), whereas left and right speakers may be spaced apart from the TV and/or sound bar. Front left and front right speakers may be at a location in front of a listener and near, but spaced apart from, the TV and/or sound bar. Or, the front left, front right, and center speakers may be located in the TV and/or sound bar. (In still other embodiments, front left and front right speakers are used in addition to similar speakers in the sound bar.) Rear left and right speakers may be generally opposite the TV and/or sound bar and may be behind or next to a typical listener's position. For convenience, front left and front right speakers are often referred to simply as left and right speakers, while rear left and rear right speakers are often referred to as surround speakers. A low frequency effects (LFE) or subwoofer speaker may be placed in any location. With left, right, center, left surround, right surround, and LFE speakers, the surround sound system is said to be in a 5.1 configuration (five speakers with one LFE speaker). For convenience, this specification uses the 5.1 surround sound configuration as a primary example to teach different aspects of the embodiments disclosed herein. However, in other embodiments, any number of speakers in configurations such as stereo, 2.1, 5.1, 5.2, 7.1, 7.2, 11.1, 11.2 or 22.2, or other configurations may be used (including without a subwoofer) together with any of the features described herein.

Users may interact with the calibration engine through an application with a graphic user interface (GUI) installed on a user device, such as a mobile device or any of the other electronic devices described above. The application can allow a user to view and configure a model layout of the surround sound system on the GUI that resembles the actual placement of the components. In some embodiments, positions of the components may be estimated automatically via a calibration process and then depicted on the GUI's model layout. For example, the positions may be estimated using the features described in U.S. Provisional Application No. 62/423,041, titled "System and Method for Loudspeaker Position Estimation," filed Nov. 16, 2016, the disclosure of which is hereby incorporated by reference in its entirety, and/or by the details in U.S. application Ser. No. 14/332,098, titled "Spatial calibration of surround sound systems including listener position estimation," the disclosure of which is incorporated by reference herein in its entirety (collectively, "the Related Applications"). In some embodiments, the components may be depicted in positions in accordance with multichannel surround system specifications. In yet other embodiments, the user may initially place components on the GUI layout. In some embodiments, the user may adjust the positions of the components on the GUI's model layout. In some embodiments, the position of the listener is estimated automatically and then depicted on the GUI. In some embodiments, the position of the listener in the GUI model layout may be adjusted by the user.

After any user change to the placement of the components and the listener on the GUI's model layout, the positions of the components and listener can be estimated from the model layout and transferred to the calibration engine. The estimated positions can then be used for spatial calibration of the surround sound system to improve the listening experience even if the loudspeakers are not arranged in a standard surround sound layout. This apparatus can greatly simplify the calibration process compared to existing commercial solutions.

FIG. 1 is a block diagram illustrating an example environment 100 for calibrating a multichannel surround sound system, in accordance with one or more embodiments. The example environment 100 comprises a front component 102 and a user device 122 connected by a network 110. The front component 102 can be any device positioned in the front (preferably center) of a home theater or surround sound system, including but not limited to, a center speaker, a sound bar, an amplifier or A/V receiver, and a video screen or TV. To provide an automatic calibration function, the front component 102 encloses an embedded calibration engine 104. In other embodiments, the calibration engine 104 may be located at any position other than front center instead of in a front center component 102.

The user device 122 can be any of the electronic devices described above. The user device 122 can run a calibration application 124 that can communicate with the calibration engine 104 over a network 110. The network 110 may be a wireless local area network, but may instead be wired. The network 110 can include any type of network, such as a LAN, a MAN, a WAN, a cellular network, a private network, or a virtual private network.

The user device 122 can execute the calibration application 124 to communicate with the calibration engine 104 in the front component 102 to engage a surround sound calibration process (often referred to herein simply as a "calibration process"). The calibration application 124 can permit the user to interact with the calibration engine 104 and have control of various functions during the calibration process, which will be described below in more detail with respect to FIGS. 2-5. The calibration application 124 can be a native application built for the user device 122 or a browser that accesses a web-based application provided by the calibration engine 104.

In one or more embodiments, the calibration application 124 provides users with an intuitive GUI for calibrating the surround sound system. The GUI can display icons representing the loudspeakers and the user placed in a model room. A user can arrange, in the GUI, a depiction of his or her listening position and/or depictions of the positions of the loudspeakers by organizing the icons inside the model room on the GUI to mirror the real-life placement of the surround sound system. The real-life positions of the listener and/or the loudspeakers can be estimated from the GUI and transmitted to the calibration engine 104, which can then compensate each of the audio channels based on the received positions to improve or otherwise optimize the listening experience. In one or more embodiments, the GUI is preferably implemented on a handheld device (122) with a touchscreen so that users can easily arrange or adjust the icon positions to reflect the actual placement or any changes to the placement with gestures. However, a touchscreen is optional, and any type of user input may be used in its place (such as mouse, keyboard, or verbal input).

Alternatively or in addition, the calibration engine 104 may utilize an optional multi-element microphone array integrated into the front component 102 to facilitate automatic detection, confirmation or adjustment of the positions of the loudspeakers and/or listener(s). The microphone array can be mounted such that it is facing other loudspeakers of the surround sound system. The distance and angle of some or all of the loudspeakers relative to the microphone array can be estimated by analyzing the inter-microphone gains and delays obtained from playing test signals through those loudspeakers, as described in the Related Applications referenced above. The subsequent processing of data received from the microphone array can also locate a listener by detecting his or her voice or other sound cues from the listener (such as an audible sound played by the user device 122) and by analyzing the inter-microphone gains and delays (see the Related Applications). In some embodiments, the calibration engine 104 may receive a request from the calibration application 124 to perform automatic estimation of the loudspeaker and/or listener positions and spatial calibration. In other cases, the position estimation and calibration process can also be triggered using voice control by the user, such as a key phrase or another sound cue.

Based on the estimated positions of each loudspeaker and the listener relative to the microphone array either automatically detected or from the GUI input, the calibration engine 104 can derive the distances and angles between each loudspeaker and the listener using a mathematical algorithm (which may implement, for example, trigonometry). The calibration engine 104 can then apply various spatial calibration operations to the audio output by the surround sound system. For example, the calibration engine 104 may adjust the delay and/or gain of multichannel audio signals sent to each loudspeaker based on the derived distances from each loudspeaker to the listener. In addition to the delay and/or gain, the calibration engine 104 may also reformat the multichannel audio for playback on the actual loudspeaker layout, for instance using panning operations. In one embodiment, the calibration engine 104 provides spatial correction for rendering object-based audio content based on the actual positions of the loudspeakers and the listener.

Example Graphical User Interfaces

Each of the user interfaces shown and described below includes one or more user interface controls that can be selected by a user, for example, using a browser or other application software. Thus, each of the user interfaces shown may be output for presentation by the calibration application 124, which may optionally include a browser or any other application software. The user interface controls shown are merely illustrative examples and can be varied in other embodiments. For instance, buttons and icons may be substituted with other types of user interface controls that provide the same or similar functionality, including, for example, dropdown boxes, select boxes, text boxes, check boxes, slider controls, and other types of user interface controls. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, game controller, keyboard input, or verbal input, among other user interface input options. The user interfaces described herein may be generated electronically by the calibration application 124 and/or the calibration engine 104 (e.g., as a web page).

Figure 2:
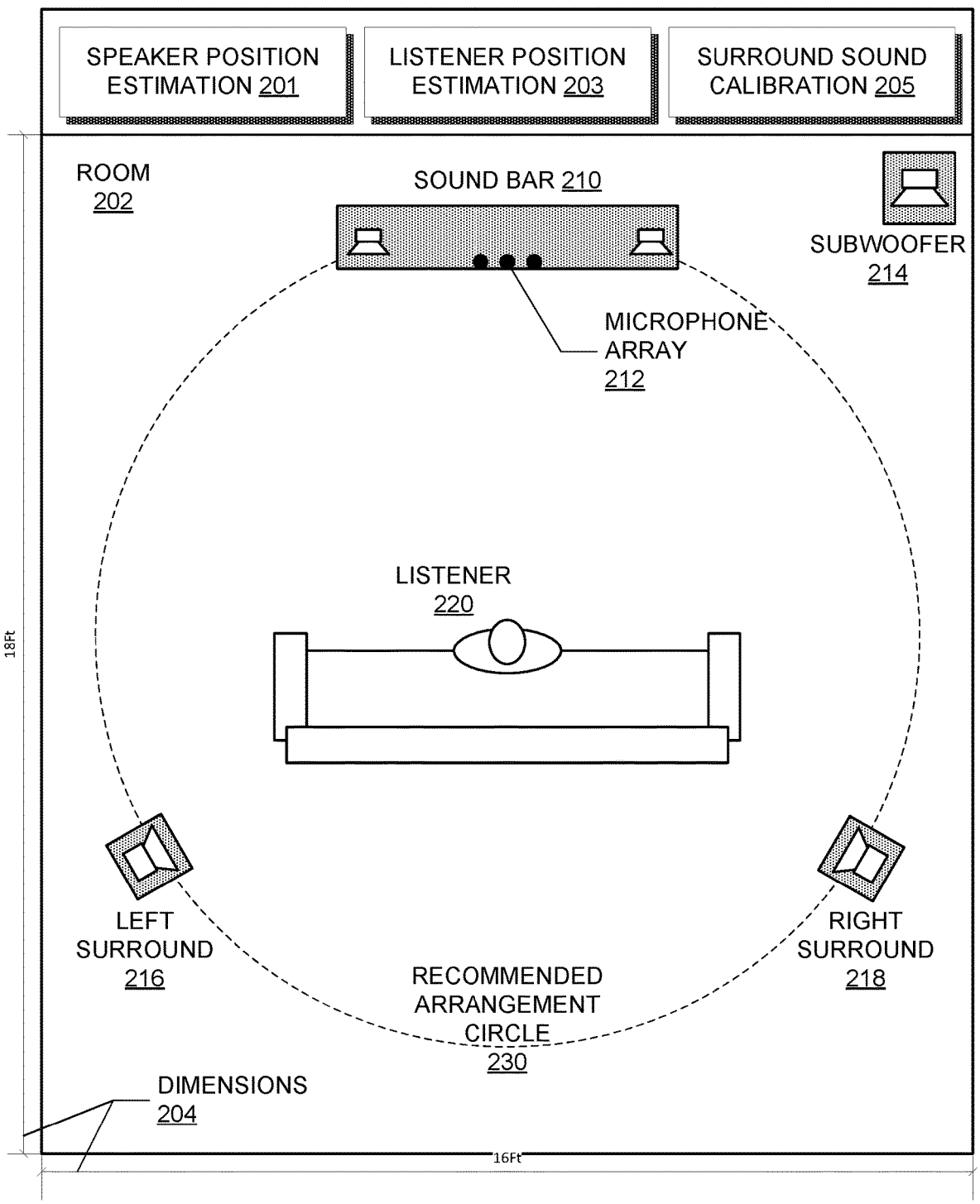
FIG. 2 is a block diagram illustrating an example graphical user interface for calibrating multichannel surround sound systems, in accordance with one or more embodiments.

FIG. 2 is a block diagram illustrating an example graphical user interface (GUI) 200 for calibrating surround sound systems, in accordance with one or more embodiments. The example GUI 200 includes a visual representation of a room, namely, a model room 202 and menu buttons 201, 203, and 205 on top. These buttons include a speaker position estimation button 201, a listener position estimation button 203, and a surround sound calibration button 205. One or more of these buttons may be omitted in other embodiments. For example, the listener position estimation button 203 may be omitted, as the listener's position may be controlled by the user moving a listener icon 220 (described below).

The model room 202 includes a 3.1 loudspeaker arrangement including a subwoofer 214, a left surround loudspeaker 216, a right surround loudspeaker 218, a sound bar 210, and a listener 220. The sound bar 210 has embedded in its enclosure a microphone array 212, a loudspeaker array and a calibration engine (not shown). Note that not all of the depicted components may be used and one or more embodiments may include additional, different, or fewer components than those shown in the example GUI 200. Variations in the arrangement and types of the components may be provided in the example GUI 200 without departing from the spirit or scope of the claims as set forth herein.

In one or more embodiments, the GUI 200 allows users to define the geometry and layout of the room 202 and the placement of furnishings and loudspeakers using a touch interface. The furnishings, loudspeakers and room arrangement can be carried out as easily as selecting, dragging or selecting borders and icons through the GUI on a touchscreen with finger gestures. For example, a user may start with a default square or oblong room model on the screen in which the user presses and moves the borders to change the dimensions 204 and then selects icons to add features, such as a fireplace, a door, and a window (among other furniture and fixtures) to various locations in the room. Various furnishings can be dragged and dropped into place in the room, such as chairs, tables, bookcases, cabinets, and couches. These can all be done by selecting an object icon from a menu and moving the icon into the model room on the GUI with fingertips. Alternatively, a generic room layout may be provided that does not include the feature of customizing the room layout besides the customization of speaker locations (described next) and optionally specifying room dimensions.

Once the furnishing of the room is done (or optionally, without doing furnishing), the user can begin a process of placement and characterization of the loudspeakers. In some embodiments, the room includes a default loudspeaker layout as a template, which the user can manipulate as desired to appropriately place the loudspeakers in the model room in accordance with their physical locations in the actual room. For instance, the example GUI 200 demonstrates such a default configuration of the surround sound system, in which icons 210, 216, 218 representing the loudspeakers are placed along a recommended arrangement circle 230 and where an icon 220 representing the listener is situated in a "sweet spot" at the center. This placement represents an ideal position setting recommended by the surround sound calibration system in accordance with industry standards. In addition, users may specify the model and/or size of the sound bar and loudspeakers from a menu (not shown), which may define the characteristics of the speakers, such as frequency responses. Default values can be chosen when such information is not available, or simply a size of "large," "midsized" or "small" may be selected to designate a loudspeaker's frequency response and radiation pattern.

FIG. 2 illustrates one example of surround sound system arrangement; other embodiments may include different loudspeaker layouts with more or fewer loudspeakers. For example, the sound bar 210 may be replaced by a center channel loudspeaker, a left front channel loudspeaker, a right front channel loudspeaker, and an A/V receiver to form a traditional 5.1 arrangement. In that case, the microphone array 212 may be embedded or integrated in the center channel loudspeaker or in the A/V receiver and coupled to the calibration engine, which may be part of the A/V receiver. Extra microphones or microphone arrays may be installed to face left and right-side front loudspeakers for better measurement and position estimation. Furthermore, the surround sound system can also be arranged in other multichannel loudspeaker layouts, such as stereo, 2.1, 5.1, 5.2, 7.1, 7.2, 11.1, 11.2 or 22.2, or object-based audio rendering layouts, such as wave field synthesis (WFS) arrays. A menu of available templates can be provided on the GUI, which allows a user to select an appropriate template matching the user's actual room speaker configuration.

As shown in FIG. 2, the menu buttons of GUI 200 include a speaker position estimation button 201, a listener position estimation button 203, and a surround sound calibration button 205. The menu buttons 201, 203 and 205 allow the user to perform the calibration step by step, or in some cases, to perform individual steps in the process. For example, if the user moves the listener icon 222 to a new position, he or she may not need to perform the loudspeaker position estimation step. In some embodiments, the user may select the listener position estimation button 203 to initiate a new estimation of the listener position. In some embodiments, he or she may move the listener icon 220 in accordance with a listener's new position. After the new listener position is established, the user may select the surround sound calibration button 205, which causes the calibration application 124 and/or calibration engine 104 to determine the appropriate processing to apply to the audio channels for the loudspeaker and listener locations depicted on the GUI. Later, when audio is played back, this processing can be applied to the audio being played back. In other embodiments, the GUI 200 may simply include a single button of "run calibration" (not shown) to automatically invoke all the necessary steps for the system calibration including loudspeaker position estimation, listener position estimation, and surround sound calibration.

When the speaker position estimation button 201 is selected, the positions of the one or more loudspeakers in the multichannel surround sound system can be estimated. For instance, an automatic speaker finding procedure can run in the calibration engine 104 (and/or calibration application 124). This procedure can implement any of the speaker finding algorithms described in the Related Applications. Generally, these algorithms can play test signals over the loudspeakers, the microphone array can detect the test signals, and the calibration engine 104 can analyze the detected signals to determine the speaker locations. Once the actual speaker locations are estimated, the calibration engine 104 can provide these estimated locations to the calibration application 124 (e.g., as coordinates). The calibration application 124 can, in turn, change the position of the icons (e.g., 210, 214, 216, and/or 218) corresponding to the speakers. As discussed below, the calibration engine 124 can also estimate improved positions for the speakers and output icons (e.g., in dashed lines or otherwise different appearance) representing locations to which the speakers could be moved to improve surround sound performance.

To prepare for the speaker location identification process, a first preparation step can be to determine the scale of the model room on the GUI 200. In one embodiment, the user can specify the scale used for the model room 202, for example, one inch on the GUI equal to three feet of the real room is a scale of 1:36. Alternatively, the scale can be calculated by the application once the user inputs the dimensions of the real room. For instance, after the user assigns the room dimensions 204 as 18 feet by 16 feet, the scale can be calculated by dividing the real dimensions by those of the model room 202 presented on the touchscreen. The length or width of the model room 202 on the GUI 200 can be automatically adjusted to make sure the scale along the length and the scale along the width are consistent.

A second preparation step can be to determine a point of reference for estimating the positions of the loudspeakers. In one or more embodiments, the reference point can be one of the listener's positions within the model room 202. The positions of the loudspeakers can be estimated in relation to the listener's position. In other embodiments, since the sound bar in FIG. 2 (or a different front component, such as a center loudspeaker or an A/V receiver) is usually predictably placed directly above or below the video screen (or TV), each surround loudspeaker's position can be estimated relative to the sound bar's center position. Note that the point of reference can be any point in the room, and positions can be translated or remapped to a position relative to any other point of reference using a mathematical algorithm (e.g., using trigonometry).

A third preparation step can be to estimate the positions based on the icon placement inside the model room and the scale of the model room. Assuming that the left surround loudspeaker 216 is placed two inches to the left and one inch behind the listener 220, multiplying the distances on the GUI 200 by the model room scale 1:36, the estimated position of the left surround loudspeaker 216 can be described as "6 feet to the left and 3 feet to the back of the listener's head." The estimated positions can be distances only, or a combination of distances and angles. For example, the estimated position of the left surround loudspeaker 216 in one example could be "10 feet away and 60 degree to the left of the sound bar 210."

This method of position estimation relies on the user input of the loudspeaker's position via the graphical user interface. How much data the user is required to input can vary depending on the design of the calibration application 124. The accuracy of the estimation depends on how accurately the user can map out his or her floor plan and arrangement of the surround sound system. A meticulous user can measure the room to the nearest inch, whereas others may simply provide a best guess in feet (or some other distance unit, such as meters). The more accurate measurements of the room and loudspeaker details the user enters, the better the system can potentially be calibrated. On the other hand, it may also decrease the ease of use for the user. The calibration application may include options for users to choose between different estimation methods.

Detailed methods of position estimation using the integrated microphone array 212 are described in detail in the Related Applications. Using one or more of these algorithms, the calibration engine 104 can run loudspeaker position estimation and output recommended changes to loudspeaker positions. The calibration application 124 can then permit a user to make adjustments to the loudspeaker and listener positions on the display, which reflect changes the listener has made or will make to loudspeaker and listener positions in the actual room. Then the calibration engine 104 can derive calibration information (e.g., gains and/or delays) based on the initial position estimates of the speakers and any changes to those positions made by the listener.

The position of the one or more listeners 220 can be estimated when the user selects the listener position estimation button 203. Various estimation methods can be implemented and selectable, including estimation from the icon placement on the GUI 200 (which can be done in the background—any time the listener position icon 220 is moved, the application's 124 internal listener position can be updated), and/or automatic position estimation using sound cues from the listener received by the microphone array 212. In one embodiment, the listener position estimation button 203 is used when listener position estimation is done using a trigger word (e.g., a verbal cue from the listener) or a video camera is used to detect the listener's position.

Although the example GUI illustrated in FIG. 2 defines the positions of the loudspeakers and listener(s) only in a two-dimensional room, the position of each loudspeaker in the z direction (height) with respect to the head position of the listener 220 can be readily added to support 3D audio calibration. For example, although shown in a two-dimensional plane, any of the GUIs described herein could be rotated in three dimensions in some embodiments to show speaker locations and recommended locations in three dimensions.

Once the loudspeaker placement is completed, the positions and other information of the loudspeakers and the listener(s) can be transferred to the calibration engine to generate output processing operations for each audio channel to compensate for room characteristics and sub-optimal loudspeaker placement. In some embodiments, the processing operations may consist of a gain and/or a delay for each audio channel. The calibration methods are described in more details, for example, in the Related Applications.

There are many alternative GUIs that could be implemented, some examples of which are provided below. In one embodiment, the GUI includes a "run calibration" button (for automated loudspeaker position estimation) and a "compensation on/off" button (to turn on/off the compensation process derived from the calibration results or position estimates). The compensation process can be performed, for example, by implementing any of the techniques described in the Related Applications. Selecting the compensation on/off button, for instance, can cause the compensation to be applied or not applied to audio during playback.

Figure 3A:
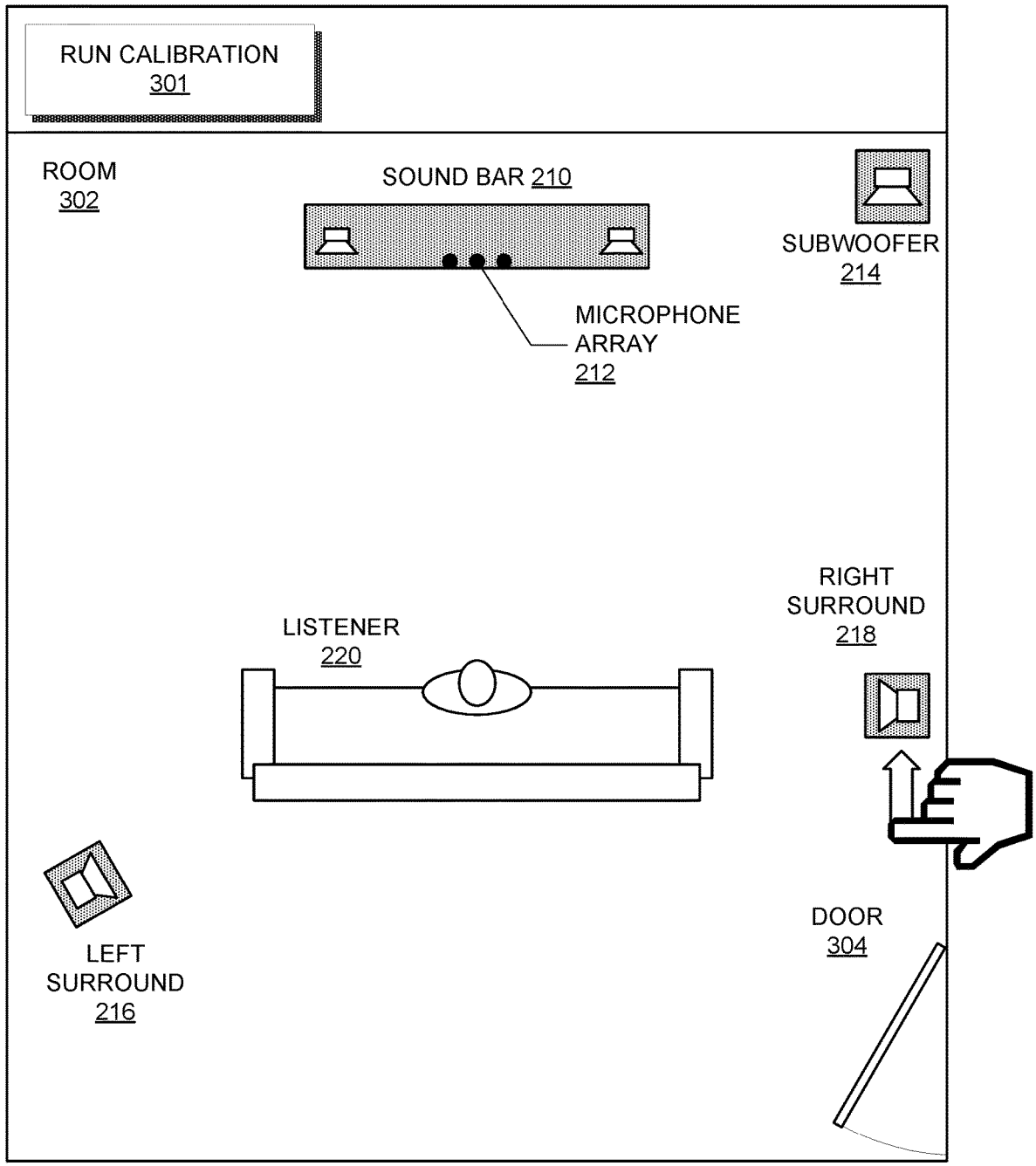
FIGS. 3A-3C are block diagrams illustrating another example graphical user interface for calibrating multichannel surround sound systems, in accordance with one or more embodiments.

FIG. 3A is a block diagram illustrating another example graphical user interface 300A for calibrating multichannel surround sound systems, in accordance with one or more embodiments. The example GUI 300A includes a single menu button 301 of "run calibration" on the top and a visual representation of the room 302. Unlike the standard room 202, the user has added a door 304 mounted at the right corner of the room 302, which caused the right surround loudspeaker 218 to be placed away from its recommended position on the arrangement circle 130. Due to this constraint, the user selects and moves the icon representing the right surround speaker 218 on the GUI 300A to its new position with his or her finger, as illustrated in FIG. 3A.

When the user selects the run calibration button 301, the position estimation of the right surround speaker 218 can be updated based on the new placement within the model room 302 and scale of the model room 302. This position estimation could alternatively happen automatically when the user finishes moving the loudspeaker icon, without selection of a run calibration button. Alternatively or in addition, the user may instruct the calibration application to perform automatic position detection using test signals to confirm or adjust the position estimated simply from GUI placement. Once the position is updated, the calibration process compensates for the updated sub-optimal location of the right surround loudspeaker 218.

Figure 3B:
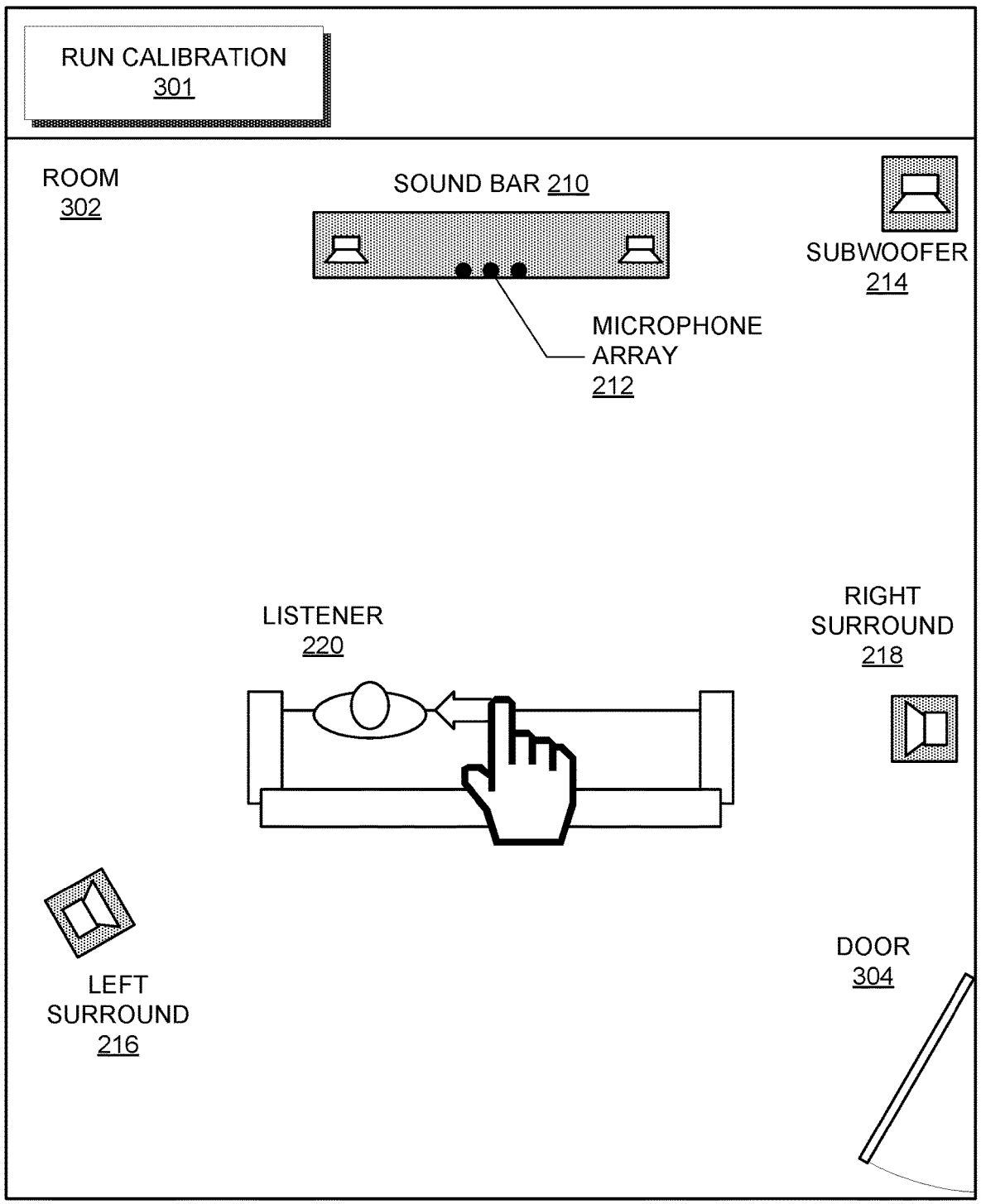

FIG. 3B is a block diagram illustrating another example graphical user interface 300B for calibrating multichannel surround sound systems, in accordance with one or more embodiments. The example GUI 300B includes the same "run calibration" menu button 301 and the visual representation of the room 302. Compared to GUI 300A, the listener 220 has moved away from the "sweet spot", i.e., the default center of the recommended arrangement circle 130 (as shown in FIG. 1) to the left side of the couch. This again causes a mismatch between the content producer's intent and the consumer's spatial audio experience.

In one embodiment, the user (in this case the listener 220) can update his or her position by simply selecting and moving the icon representing the listener 220 on the GUI 300B to the new position with a finger, as illustrated in FIG. 3B. When the user selects the run calibration button 301, the calibration system can then perform the calibration based on the user input of the updated position of the listener 220. Alternatively, as described above, this calibration could be done automatically when the user is done moving the listener icon (or on the fly, as the user moves the icon). The listener's position may be estimated based on a sound cue from the listener received at the microphone array 212. The sound cue can be a voice command or any other sound made by the listener. The calibration engine then estimates the distance and angle of the listener position (e.g., relative to the microphone array) for calibration purposes.

As used herein, the term "calibration," in addition to having its ordinary meaning, can refer to the computation of speaker positions and determining the appropriate transfer functions to be applied to each speaker channel. As used herein, the term "compensation," in addition to having its ordinary meaning, can refer to the actual processing to be carried out on each channel as derived by the calibration, such as applying gains and/or delays to each channel.

Figure 3C:
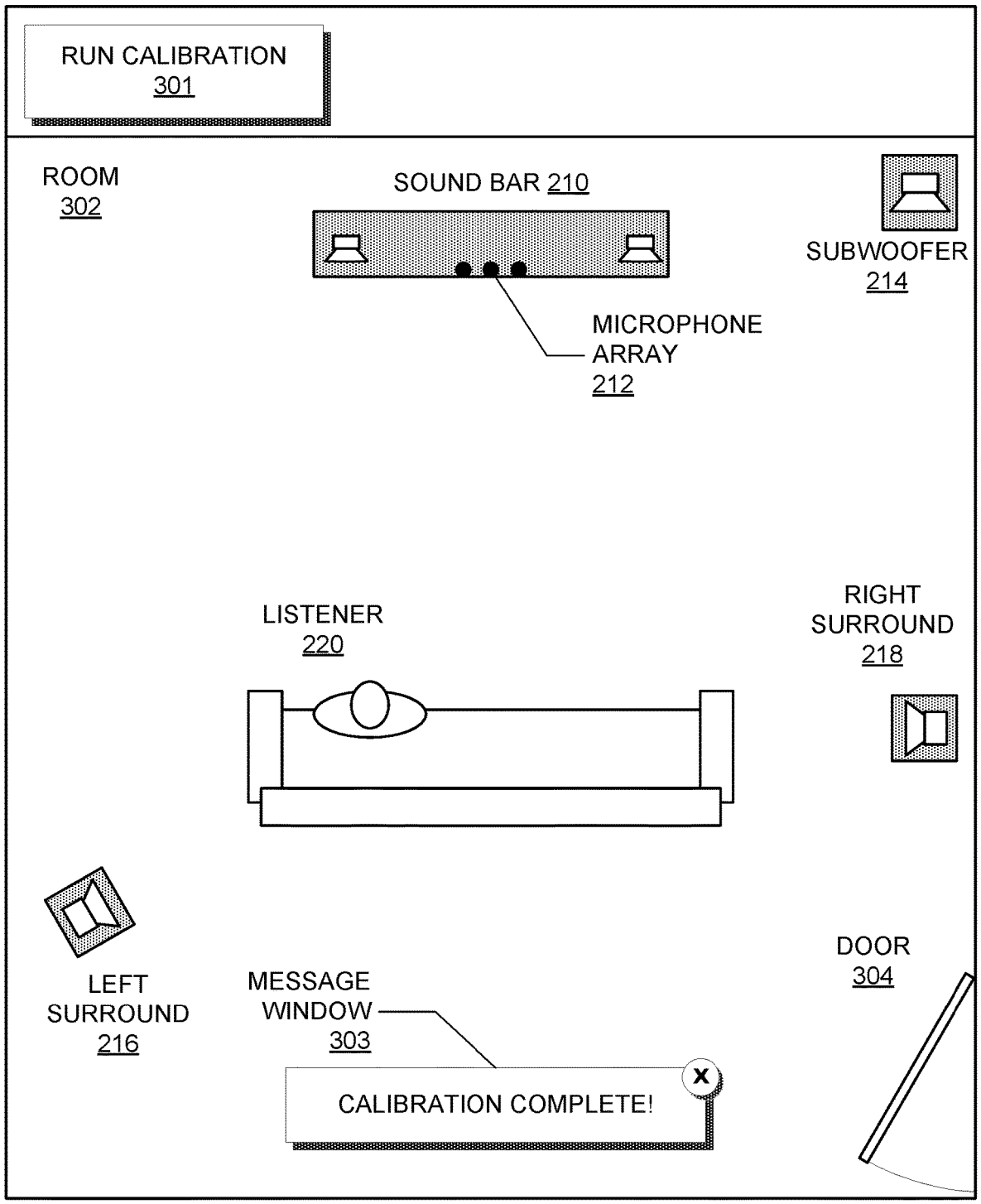

FIG. 3C is a block diagram illustrating another example graphical user interface 300C for calibrating multichannel surround sound systems, in accordance with one or more embodiments. The example GUI 300C includes a message window 303. The message window 303 displays a message "Calibration Complete" notifying the user that the calibration process has completed. The message window 303 can display other messages such as notifications on position estimations or error messages. Selecting the top right "X" with a finger can close the message window 303. The location of the message window 303 can be anywhere in the display.

Figure 4:
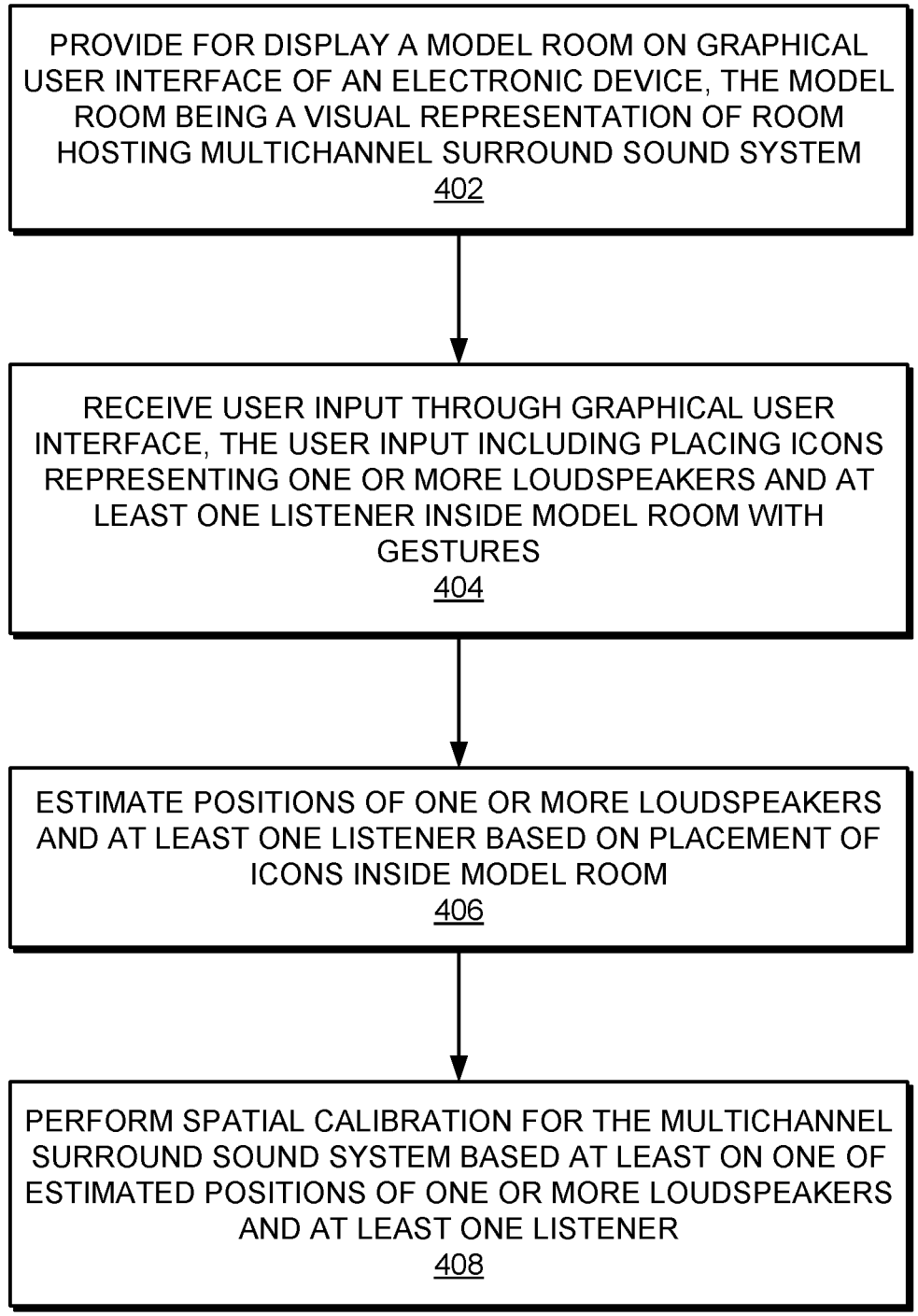
FIG. 4 is a flowchart illustrating an example process for providing surround sound system calibration through a graphical user interface on a touchscreen, in accordance with one or more embodiments.

FIG. 4 is a flowchart illustrating an example process for providing surround sound system calibration through a graphical user interface on a touchscreen, in accordance with one or more embodiments. It should be noted that FIG. 4 only demonstrates one of many ways in which the position estimations and calibration through a graphical user interface on a touchscreen may be implemented. In the example, the method is performed by the calibration system comprising the calibration engine 104, through a graphical user interface provided by the calibration application 124 on the user device 122.

The process begins when a graphical user interface of the calibration application 124 for calibrating a multichannel surround sound system is provided (step 402) for display on the user device 122. The graphical user interface includes a model room, which is a visual representation of a room hosting the multichannel surround sound system.

Next, user input is received (step 404) through the graphical user interface on the touchscreen. The user input includes defining the geometry, layout and furnishings of the model room 202, as well as placing icons representing one or more loudspeakers and at least one listener in the model room 202 using gestures on the interface. The placement of the icons can be done manually by selecting icons from a menu or a reservoir of icons and placing them in the model room. Alternatively or in addition, the graphical user interface may provide a default model room and a default arrangement of the multichannel surround sound system for the user to manipulate as desired. For example, such manipulations may include dragging borders to adjust room dimensions, or adding, removing or replacing room furnishings as well as loudspeakers. Also, the user interface may permit one or more listeners to added, removed, or moved. The purpose of the user input can be to ensure that the model room represents the floor plan and arrangement of the real room as accurately as possible. Examples of the graphical user interface of the calibration application including the arrangement of the multichannel surround sound system inside the model room are illustrated in FIGS. 2 and 3A-3C.

The calibration system subsequently estimates (step 406) the positions of the one or more loudspeakers and the at least one listener. In one or more embodiments, the estimation is based on the placement of the icons representing the one or more loudspeakers and the at least one listener inside the model room on the graphical user interface. Other parameters, such as the scale of the model room and a point of reference in the room, are also needed for the estimation. Estimation can proceed using any of the techniques described above, with the user then making appropriate adjustments to speaker and listener positions. Optionally, the estimated positions can be verified by an automatic position estimation utilizing, for example, the microphone array 212 embedded in the sound bar 210. Inaccuracy or errors in the estimation based on placement of icons on the graphical user interface can be corrected with the automatic position estimation.

The calibration engine then performs the spatial calibration (step 408) for the multichannel surround sound system based on at least one of the estimated positions of the one or more loudspeakers and the at least one listener. In one or more embodiments, the example calibration process may be used for initial system setup. Alternatively or in addition, users may explicitly request position estimations and recalibration of the multichannel surround sound system. In some embodiments, the loudspeaker positions are estimated automatically, and then the loudspeaker icons are displayed on the GUI in accordance with the estimates while the listener position is derived from the placement of the listener icon in the model room on the GUI.

Figure 5:
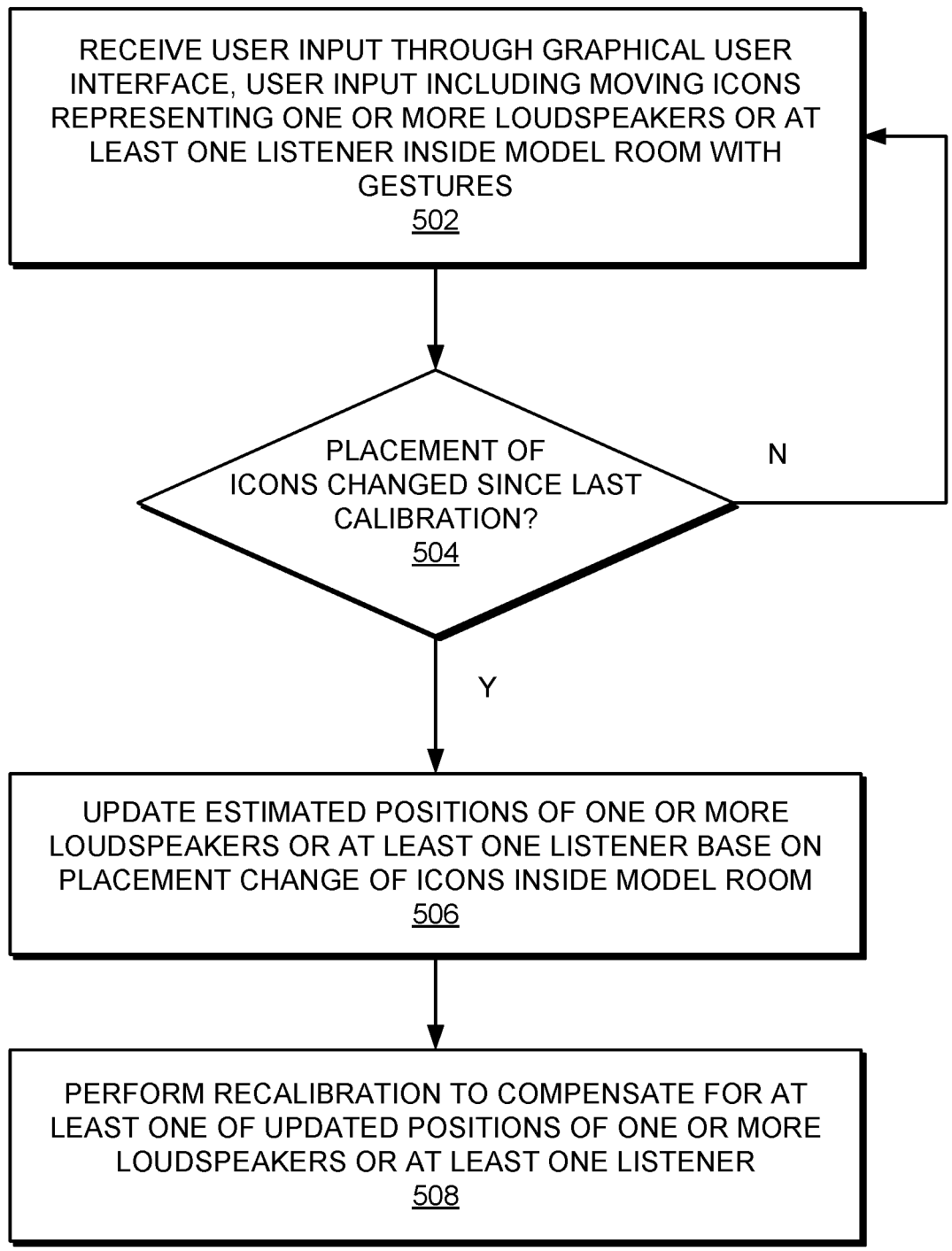
FIG. 5 is a flowchart illustrating another example process for providing surround sound system recalibration through a graphical user interface on a touchscreen, in accordance with one or more embodiments.

FIG. 5 is a flowchart illustrating another example process for providing surround sound system recalibration through a graphical user interface, according to one embodiment. It is appreciated that FIG. 5 demonstrates one of many ways in which the position estimations and calibration through a graphical user interface on a touchscreen may be implemented. Similar to FIG. 4, the example method is performed by the calibration system comprising the calibration engine 104, which includes one or more processors, a memory and a microphone array 212 embedded in the front component 102, through a graphical user interface provided by the calibration application 124 on the user device 122.

The process begins when user input is received (step 502) through the graphical user interface of the calibration application 124 for calibrating a multichannel surround sound system. The user input includes moving icons representing one or more loudspeakers and at least one listener in the model room 202 using gestures. The graphical user interface also displays the model room in which the multichannel surround sound system is hosted.

Next, the calibration system determines (step 504) whether the placement of any of the icons representing one or more loudspeakers and at least one listener in the model room has been changed since last calibration. If it is determined that no placement of the icons has changed, the process goes back to the start point waiting for further user input. Otherwise, if the placement of any of the icons has changed, the calibration system updates (step 506) the estimated positions of the one or more loudspeakers or at least one listener based on the placement change of the icons inside the model room. Other parameters, such as the scale of the model room and a point of reference in the room, can also be used for the update. Examples of the user input including changing the placement of the icons representing the loudspeakers and listener are illustrated in FIGS. 3A and 3B.

Furthermore, the position update can be optionally verified by the automatic position estimation utilizing, for example, the microphone array 212 embedded in the sound bar 210. Inaccuracy or errors from the position estimation update based on the placement of icons on the graphical user interface can be corrected with the automatic position estimation process.

The calibration engine then performs the recalibration (step 508) to compensate for at least one of the updated positions of the one or more loudspeakers and the at least one listener. In some embodiments, users may explicitly request to perform recalibration of the multichannel surround sound system even though there is no change in the placement of the icons representing loudspeakers and listener(s) on the graphical user interface.

In conclusion, embodiments provide a system and a method for calibrating surround sound systems. The calibration system provides a graphical user interface for display comprising a visual representation of the room hosting a multichannel surround sound system. The graphical user interface allows user input of simple gestures to place or make changes to the placement of icons representing one or more loudspeakers and at least one listener inside the model room. In addition, the calibration system is able to estimate the positions of the one or more loudspeakers or the listener based on the placement of the icons in the model room. Based on the estimated positions and calibration thereon, the surround sound system can provide a more accurate reproduction of the intended sound scene than an uncalibrated system. For channel-based input, the calibration system can also perform spatial correction to correct spatial errors due to nonstandard loudspeaker setup and listener position changes.

TERMINOLOGY

Many other variations than those described herein can be apparent from this disclosure. For example, depending on the embodiment, certain acts, events, or functions of any of the algorithms described herein can be performed in a different sequence, can be added, merged, or left out altogether (e.g., not all described acts or events can be necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Not necessarily all such advantages are achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality can be implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a hardware processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, are generally intended to convey that certain embodiments include, while other embodiments do not include, certain features, elements and/or states. Thus, such conditional language is not generally intended to imply that features, elements and/or states are in any way may required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" mechanism one, some, or all of the elements in the list.

Disjunctive language such as the phrase "at least one of X, Y, or Z," unless specifically stated otherwise, can be otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments may require at least one of X, at least one of Y, or at least one of Z to each be present.

Unless otherwise explicitly stated, articles such as "a" or "an" should generally be interpreted to include one or more described items. Accordingly, phrases such as "a device configured to" is intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it is understood that various omissions, substitutions, and changes in the form and details of the devices or algorithms illustrated can be made without departing from the spirit of the disclosure. As is recognized, certain embodiments of the inventions described herein can be embodied within a form that does not provide all of the features and benefits set forth herein, as some features can be used or practiced separately from others.

What is claimed is:

1. A system for calibrating a multichannel surround sound system with a loudspeaker, the system comprising:
   one or more processors in communication with the multichannel surround sound system; and
   a machine-readable medium comprising instructions stored thereon that, when executed by the one or more processors, cause the one or more processors to perform operations comprising:
      causing output of a graphical user interface, the graphical user interface comprising a graphical representation of a building interior depicting a speaker icon at an initial position, wherein the speaker icon corresponds to the loudspeaker;
      processing an indication that the speaker icon is adjusted using the graphical user interface from the initial position to a modified position;
      estimating an actual location of the loudspeaker using at least one test signal;
      automatically adjusting the speaker icon from the modified position to a second modified position corresponding to the estimated actual location of the loudspeaker; and
      calibrating audio for playback through the loudspeaker based on the speaker icon being located at the second modified position.

2. The system of claim 1, wherein the graphical user interface provides a default graphical representation of the building interior and a default arrangement of the loudspeaker.

3. The system of claim 2, wherein the operations further comprise processing a second indication that borders of the graphical representation of the building interior are moved to adjust dimensions of the default graphical representation of the building interior with finger gestures on a touchscreen.

4. The system of claim 1, wherein operations further comprise processing a second indication adding a second speaker icon corresponding to a second speaker within the graphical representation of the building interior with finger gestures on a touchscreen.

5. The system of claim 1, wherein the second modified position includes a distance and an angle relative to a reference point in the graphical representation of the building interior.

6. The system of claim 5, wherein the reference point in the graphical representation of the building interior is the center of a front component of the multichannel surround sound system, the front component including a sound bar, a center-channel loudspeaker or an audio-visual (A/V) receiver.

7. The system of claim 1, wherein the operations further comprise estimating the actual position of the loudspeaker based on a scale of the graphical representation of the building interior and a reference point in the graphical representation of the building interior.

8. The system of claim 1, wherein the initial position is obtained via selection from presets.

9. The system of claim 8, wherein the initial position can be adjusted through calibration.

10. The system of claim 9, wherein the calibration uses an integrated microphone array located at a front component of the multi-channel surround sound system and a noise sequence outputted from the loudspeaker.

11. The system of claim 1, wherein the initial position can be adjusted using a touch screen.

12. The system of claim 1, wherein the operations further comprise:
   processing a second indication that the speaker icon is moved from the second modified position to a third modified position with gestures; and
   in response to determining a change in the placement of the speaker icon since the audio was last calibrated, performing a recalibration to compensate for the speaker icon being moved to the third modified position.

13. A method for calibrating a multichannel surround sound system with a loudspeaker, the method comprising:
   under control of a hardware processor,
      causing output of a graphical user interface, the graphical user interface comprising a graphical representation of a building interior depicting an icon at an initial position, wherein the icon corresponds to the loudspeaker;
      receiving an indication that the icon is adjusted via the graphical user interface from the initial position to a modified position;
      estimating an actual location of the loudspeaker using at least one test signal;
      automatically adjusting the icon from the modified position to a second modified position corresponding to the estimated actual location of the loudspeaker; and causing output, through the loudspeaker, of content calibrated according to the icon being located at the second modified position.

14. The method of claim 13, wherein the graphical user interface provides a default graphical representation of the building interior and a default arrangement of the loudspeaker.

15. The method of claim 14, further comprising receiving a second indication that borders of the graphical representation of the building interior are moved to adjust the dimensions of the default graphical representation of the building interior with finger gestures on a touchscreen.

16. The method of claim 14, further comprising receiving a second indication that a second icon corresponding to a second loudspeaker is added within the graphical representation of the building interior with finger gestures on a touchscreen.

17. The method of claim 13, wherein the second modified position includes a distance and an angle relative to a reference point in the graphical representation of the building interior.

18. The method of claim 17, wherein the reference point in the graphical representation of the building interior is the center of a front component of the multichannel surround sound system, the front component including a sound bar, a center channel loudspeaker or an audio-visual (A/V) receiver.

19. The method of claim 13, wherein estimating an actual location of the loudspeaker further comprises estimating the actual position of the loudspeaker based on a scale of the model room and a reference point in the model room.

20. The method of claim 13, further comprising:

receiving a second indication that the icon is moved from the second modified position to a third modified position;

in response to determining a change in the placement of the icon since a last calibration was performed, causing performance of a recalibration to compensate for the icon being moved to the third modified position.

* * * * *